United States Patent [19]
Sletten et al.

[11] 3,787,849
[45] Jan. 22, 1974

[54] AIRBORNE DIGITAL MOVING TARGET DETECTOR

[75] Inventors: Carlyle J. Sletten, Acton; William B. Goggins, Jr., Winchester, both of Mass.

[73] Assignee: The United States of America as represented by the Secretary of the Air Force, Washington, D.C.

[22] Filed: Nov. 7, 1972

[21] Appl. No.: 304,584

[52] U.S. Cl. .......... 343/7.7, 343/5 DP, 343/100 CL
[51] Int. Cl. .............................................. G01s 9/42
[58] Field of Search.... 343/5 DP, 7.7, 8, 9, 100 SA, 343/100 CL

[56] References Cited
UNITED STATES PATENTS
3,176,297  3/1965  Forsberg........................ 343/100 SA
3,359,409  12/1967  Dryden..................... 343/100 CL X
3,680,100  7/1972  Woerrlein.................. 343/100 CL X
3,689,750  9/1972  Esser............................. 343/5 DP X
3,735,400  5/1973  Sletten et al........................ 343/7.7

Primary Examiner—T. H. Tubbesing

[57] ABSTRACT

A digital moving target detector in which the transmitter feeds a Butler matrix connecting a series of antennas. On reception the received signals are fed to a sample and store circuit, fed to a series of scaling multipliers, and then summed in N groups with each group including samples corresponding to range bins. The groups are stored at every pulse and then multiplied with a digital reference waveform and summed. Also the received signals can be converted to a Fourier Transform by an FFT algorithm, multiplied by correlation complex numbers in sequence and then added to corresponding products of corresponding sequences, the inverse Fourier Transform thereof represents radar outputs.

4 Claims, 7 Drawing Figures

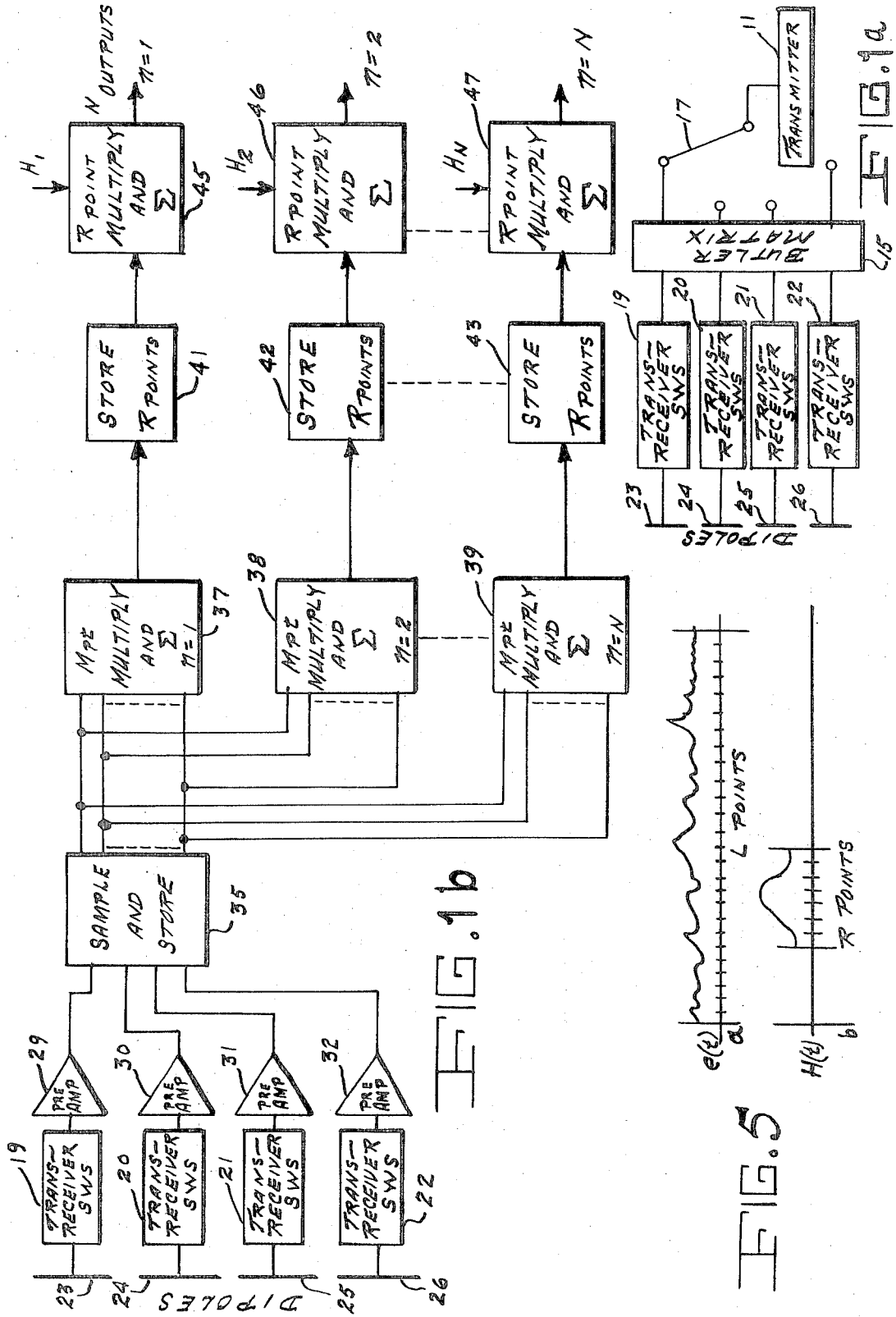

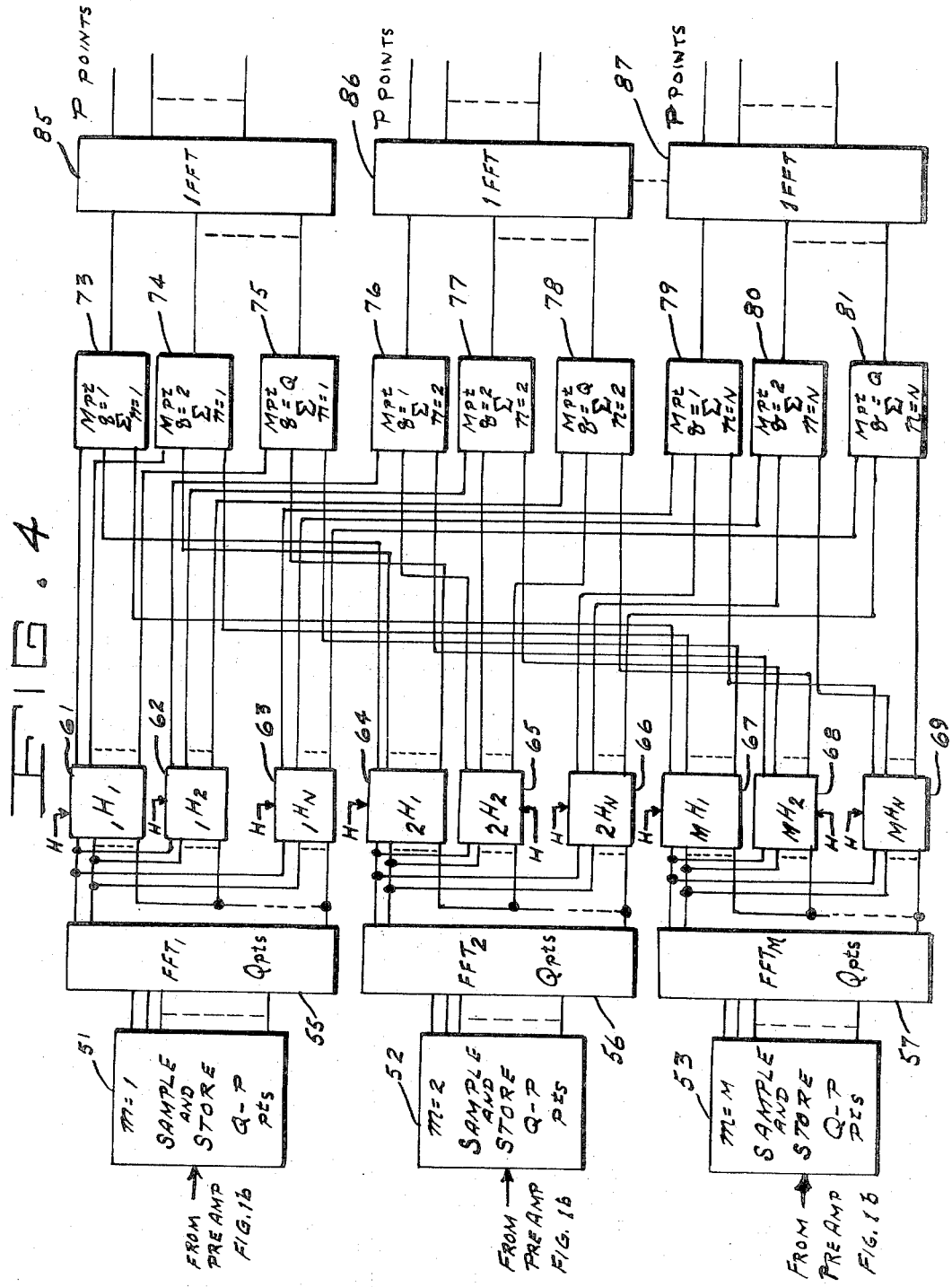

AIRBORNE DIGITAL MOVING TARGET DETECTOR

BACKGROUND OF THE INVENTION

This invention relates to digital moving target detectors, and more particularly to a detection system using multiple pattern antenna null formation with digital matching doppler filters.

For airborne early warning against low flying enemy aircraft and submarine launched missiles, elevated airborne radars are needed to obtain sufficient range and prevent the curved earth from obscuring low flying threats. Present airborne early warning radars suffer from ground clutter that produce false targets and require costly radomes and aerodynamics.

This invention provides an improved digital method for detection and location of aircraft from an airborne search radar which greatly reduces the masking effect of ground clutter on moving target detection. The antenna system can be flush mounted on the air-frame, thus eliminating the large radomes. Effects of aircraft structure on antenna sidelobes can be compensated for and improved range and signal to noise ratios achieved by moving range gates following the doppler filters.

SUMMARY OF THE INVENTION

The present invention presents a novel antenna and digital doppler filtering system useful for airborne search radars or sonars. A system of sequentially switched or simultaneously multibeam antenna patterns is generated for transmission and another set of receiving patterns obtained with deep nulls in the azimuth angular intervals corresponding to ground clutter which would normally enter the bandpass doppler filter of the receiving channel. A bank of bandpass doppler filters covering radial velocity doppler frequencies of all targets of interest are designed to have extremely high attenuation on the main beam clutter of the received antenna pattern to which it is connected. A digital system is described for processing many targets in large volumes of radar search. Signal to clutter improvement is obtained by optimizing antenna gain and null shaping and by moving range gates behind doppler filters.

It is an object of the invention to provide an improved digital method and system for detecting and locating aircraft from airborne radar.

It is another object to provide an improved airborne digital moving target radar which greatly reduces the effect of ground clutter.

These and other objects, advantages and features of the invention will become more apparent from the following description taken in connection with the illustrative embodiment in the accompanying drawings.

DESCRIPTION OF THE DRAWINGS

FIGS. 1a and 1b are block diagrams of an embodiment of the invention;

FIG. 4 shows a second embodiment of the invention using Fast Fourier Transforms; and FIG. 5 consists of graphs used in the explanation of the Fast Fourier Transform.

DETAILED DESCRIPTION OF THE PREFERRED EMBODIMENT

Figure 3A:
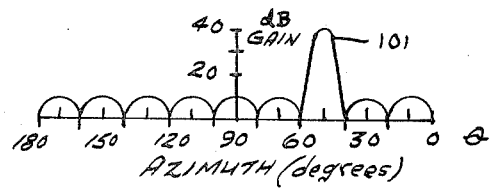
FIGS. 3a, 3b, and 3c are graphs showing antenna patterns.

FIG. 1a shows the system of the digital anticlutter radar system which is illustrated using a four-element array for simplicity, although any number of elements can be used. Radar pulses are generated from coherent transmitter 11 and these pulses are fed to the four elements of Butler matrix 15 through electronic switch 17. The Butler matrix is described in ELECTRONIC DESIGN, Vol. 9, pp 170–173, April 12, 1961, in *Beam-Forming Matrix Simplifies Design of Electronically Scanned Antennas*, by J. Butler and R. Lowe. The output of Butler matrix 15 is fed through transmitter-receiver switches 19–22 to radiating elements 23–26 which can have various forms such as slots or dipoles.

FIG. 1b shows a reception system of the digital anticlutter radar system. After the radiating pulses are received by the same elements 23–26, the signals are fed via transmitter-receiver switches 19–22 to preamplifiers 29–32.

The antenna can consist of an array of elements, for example, slots or dipoles, mounted on the fuselage or wing of search aircraft. On transmission all pulse power is fed to one beam (or alternatively to many simultaneous beams) of a Butler array as mentioned. Several such overlapping beams are available with this type of array covering, for example, ± 45° of azimuth with a beam width of 4°. On reception each radiating element is disconnected from Butler matrix 15 and multiple patterns each with the main beam coincident with the transmit beam but with deep doppler notches obtained by a technique known as the Drane-McIlvenna method are directed toward the doppler clutter spectrum angles where sidelobe clutter frequency would be accepted by sharply tuned doppler filters. The Drane-McIlvenna technique is discussed in, *Null Steering and Maximum Gain in Electronically Scanned Dipole Arrays*, by C. J. Drane, Jr. and J. F. McIlvenna, in AFCRL 72-0083, 1 Feb. 1972. Fixed or slow moving targets with a doppler spectrum within the clutter spectrum of the main beam are not detected. Sector scanning can be done sequentially or simultaneously switching to available Butler beams. Beam comparison on targets with the same range and dopplers could be made to improve azimuth accuracy. When radar is used for long range search, the doppler variation with elevation look angles is minimal.

The digital processing techniques used is essentially digital matched filtering which detects doppler frequencies in airborne moving target indicator radar and computes the complex correlation function $$f_D(t) = \sum_{r=0}^{R-1} l_r H p - r$$

which is the R point coupled input sequence to the digital filter, while $H_r$ is an R point sequence of weighting coefficients. In the digital filtering problem of Drane-McIlvenna null placement technique, the $H_r$ sequence is chosen so that the doppler filter center frequency is placed at the desired doppler frequency but a doppler null is placed at a frequency corresponding to the ground clutter doppler spectrum of the main beam of the doppler filter (if such an angle exists). This angle may not exist if the doppler filter center frequency corresponds to a relative radial target velocity greater than the airborne MTI platform speed.

In general there are two ways of performing the digital processing. One method directly computes the correlation and the other utilizes the Fast Fourier Transform.

Figure 2:
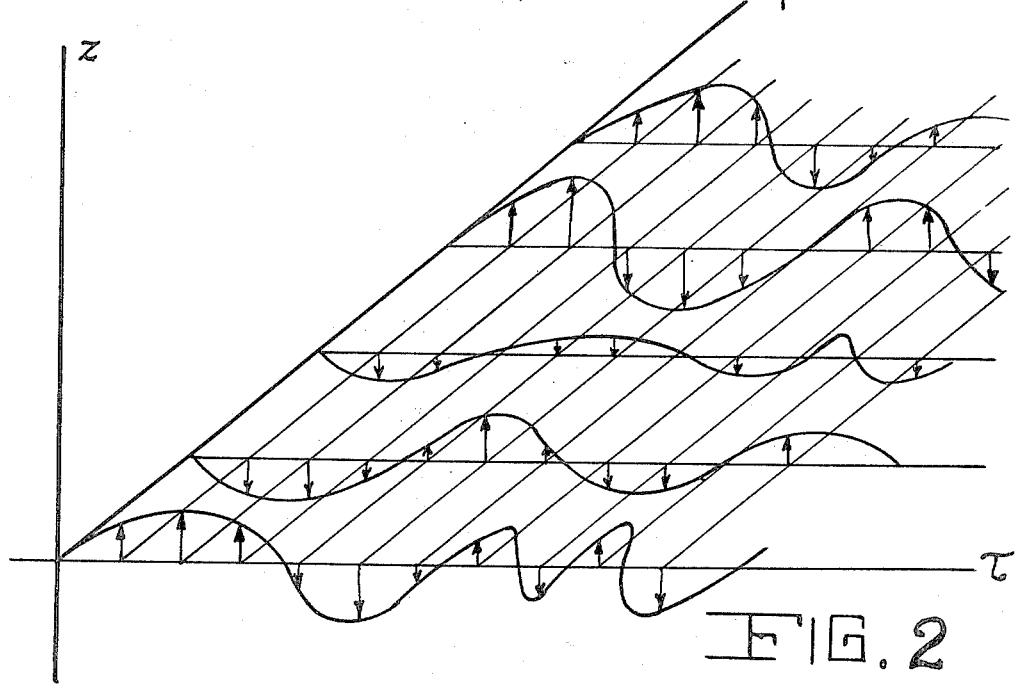
FIG. 2 shows a graph of waveforms of received radar waves and the sampling technique.

In the correlation method as shown in FIG. 1b, the output of each antenna element from amplifiers 29–32 is sampled by sample and store circuit 35 at a rate corresponding to the bandwidth of the radar system. The number of samples for any interpulse period is equal to the number of range bins processed. Each sample corresponds to a range bin and is represented by a complex number. For each doppler filter these complex numbers, one corresponding to each antenna element, are summed so as to place a physical antenna array null at an angle measured from broadside.

$$\theta = \sin^{-1}(fC/2 f_o V)$$

where $f$ is the doppler filter center frequency, C is the speed of light, $f_o$ is the center frequency of the radar and V is the aircraft velocity. Note that there are doppler frequencies for which the argument is greater than one and would not exist. There are N different doppler beams and thus N ways of summing the antenna element ouputs as indicated in FIG. 2. For each pulse sent out the operation is repeated. R samples which are samples in $t$ are accumulated and stored in a dynamic memory for digital filtering. At each subsequent pulse, data is shifted in the memory. During the interpulse period the R points presently stored are correlated with r which are the set of coefficients used to perform the digital doppler filtering as well as to place the doppler null at a frequency given by $$f = 2 f_o (V/C) \sin \theta_o$$

where $\theta_o$ is the direction in which the physical antenna beam is formed.

The sample and store outputs are fed to multipliers and summers 37–39 and are then stored in memory 41–43 and then to multiplier and summer 45–47 which are also fed by the H coefficients. There will be one output from each of the N filters corresponding to the N doppler frequencies which are used for the velocity sorting. This operation is repeated sequentially during the interpulse period for each range bin which must be processed and a new output is obtained for each interpulse period.

Figure 3B:
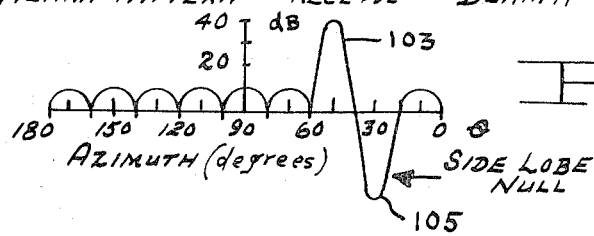
Figure 3C:
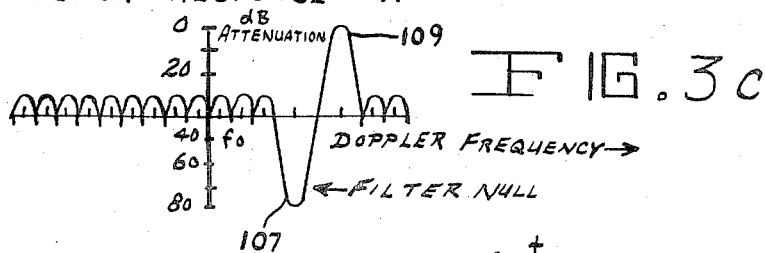

FIGS. 3a, 3b and 3c show the relationship between doppler frequency response and antenna patterns on reception and transmission. FIG. 3a is an example of transmission patterns showing main lobe 101 with numerous side lobes. FIG. 3b is an example of an antenna pattern upon receiption showing main lobe 103 and side lobe null 105. FIG. 3c shows the doppler frequency response of a single doppler filter where the horizontal coordinate represents the doppler frequency. Curve 107 is the filter null and curve 109 is the filter peak response.

An alternative system of performing the same digital filtering using the Fast Fourier Transform is shown in FIG. 4 where N = number of doppler beams
M = number of antenna elements
R = number of points in filter
P = number of output points to be processed at any one time = L-R
Q = number of FFT points = R+L
L = number of input points to FFT.

The FFT processor requires greater storing but uses a computationally more efficient algorithm. In the FFT processor a number of points in the time sequence of the filtered output is produced simultaneously which is accomplished by initially storing more input points, L than are processed by the correlation function as shown in FIG. 5. The digital matched filter computes a cross correlation function, L×R which is performed in the time domain by incrementally sliding (b) across (a) from one end to the other and integrating under the product at each increment. The FFT correlation is performed as follows: L points of the input are sampled in sample and store circuits 51–53. Q − L zeros are appended and the FFT of this function is taken in circuits 55–57. R points of H are appended with Q − R zeros and the FFT taken. This second FFT can be prestored since H does not change unless the system is adaptive. The product of these two FFTs is then taken in circuits 61–69. This is shown in FIG. 4 which is a block diagram for the system. There is a different H for each doppler beam and since a different antenna array beam forming vector is required for each doppler beam it is efficient to combine the coefficients to form the doppler beam and to form the antenna beam at this point in frequency domain. The outputs of this multiplication are then summed in summing circuits 73–81 to form the antenna beams. The filtering process is completed by taking an inverse Fast Fourier Transform in circuits 85–87 and eliminating extraneous information on the ends of the time sequence which has been generated by appending the zeros to the input and the correlation function. The result is P points of the correlation function.

What is claimed is:

1. A digital airborne moving target detection system comprising:
 a. a radar transmitter;
 b. a plurality of radiating elements;
 c. means for connecting the plurality of radiating elements to the radar transmitter in a preselected pattern; and
 d. a digital correlator including,
  1. a sampling and storing circuit fed by the plurality of radiating elements,
  2. a first series of multiplying and summing circuits equal to the number of radiating elements, fed by the sampling and summing circuit,
  3. a plurality of storing means, fed by one each of the first series of multiplying and summing circuits; and
  4. a second series of multiplying and summing circuits fed by one each of the plurality of storing means and coefficients of a sequence waveform.

2. A digital airborne moving target detection system according to claim 1 wherein the connecting means comprises:
 a. a Butler matrix having a plurality of inputs and a plurality of outputs being fed to one each of the plurality of radiating elements; and
 b. means for selectively switching the transmitter to the plurality of inputs of the Butler matrix.

3. A digital airborne moving target detection system comprising:
 a. a radar transmitter;
 b. a plurality of radiating elements;

c. means for connecting the plurality of radiating elements to the radar transmitter in a preselected pattern; and d. a digital correlator including,
   1. a plurality of sampling and storing circuits fed by one each of the radiating elements,
   2. a plurality of means for performing Fast Fourier Transforms fed by one each of the sampling and storing circuits and having a plurality of outputs.
   3. a plurality of series of multipliers, one each of the plurality being fed by one each of the Fast Fourier Transform means with each of the series being fed by every output of the corresponding Fast Fourier Transform means and fed by Fourier Transforms of coefficients of reference waveforms,
   4. a plurality of series of summers with each summer being fed by corresponding multipliers of each of the series of multipliers, and
   5. a plurality of means for performing inverse Fast Fourier Transform fed by one each of the plurality of series of summers.

4. A digital airborne moving target detection system according to claim 3 wherein the connecting means comprises:

a. A Butler matrix having a plurality of inputs and a plurality of outputs being fed to one each of the plurality of radiating elements; and b. means for selectively switching the transmitter to the plurality of inputs of the Butler matrix.

* * * * *